US010292339B2

(12) United States Patent
Zappia et al.

(10) Patent No.: US 10,292,339 B2
(45) Date of Patent: May 21, 2019

(54) TERRARIUM

(71) Applicants: Simon Ross Zappia, Hindmarsh (AU); Lesley Danielle Williams, Hindmarsh (AU)

(72) Inventors: Simon Ross Zappia, Hindmarsh (AU); Lesley Danielle Williams, Hindmarsh (AU)

(*) Notice: Subject to any disclaimer, the term of this patent is extended or adjusted under 35 U.S.C. 154(b) by 232 days.

(21) Appl. No.: 15/294,597

(22) Filed: Oct. 14, 2016

(65) Prior Publication Data

US 2017/0079217 A1    Mar. 23, 2017

(51) Int. Cl.
*A01G 9/14* (2006.01)
*A01G 9/02* (2018.01)
*B65D 25/54* (2006.01)
*B65D 43/02* (2006.01)

(52) U.S. Cl.
CPC .............. *A01G 9/02* (2013.01); *B65D 25/54* (2013.01); *B65D 43/0202* (2013.01)

(58) Field of Classification Search
CPC ...... A01G 9/16; A01G 13/0212; A01G 18/64; A01G 9/02
See application file for complete search history.

(56) References Cited

U.S. PATENT DOCUMENTS

| 926,574 A | * | 6/1909 | Kift | A01G 9/02 47/29.2 |
| 3,704,545 A | * | 12/1972 | Van Reisen | A01G 9/02 206/423 |
| 8,112,937 B1 | * | 2/2012 | Byerley, Jr. | A01G 9/16 47/66.1 |
| 2010/0162624 A1 | * | 7/2010 | Bradley | A01G 9/02 47/66.7 |
| 2015/0143743 A1 | * | 5/2015 | McClay | A01G 9/02 47/29.4 |
| 2015/0282439 A1 | * | 10/2015 | Cantley | A01G 9/14 47/69 |
| 2017/0020092 A1 | * | 1/2017 | Bijl | A01G 13/0212 |

* cited by examiner

*Primary Examiner* — Richard G Davis
(74) *Attorney, Agent, or Firm* — The Webb Law Firm (57) ABSTRACT

The present invention relates to a terrarium of the closed type which includes a base for holding a plant (typically tropical plant varieties such as moss) and any excess moisture, and a removable lid which together with the base forms an enclosure around the plant and creates a humid and sheltered environment. The terrarium may include a removable lid which has an internal upper surface that is shaped to direct condensate forming on the upper surface of the lid to a particular area of the plant. The terrarium may include a base and lid having overlapping portions wherein the overlapping portions include edge deviations or apertures that may be brought into co-alignment to provide for no, partial or full aeration.

20 Claims, 6 Drawing Sheets

TERRARIUM

FIELD OF THE INVENTION

The present invention relates to a terrarium of the closed type which includes a base for holding a plant (typically plant varieties such as moss) and any excess moisture, and a removable lid which together with the base forms an enclosure around the plant to create a humid, warm and sheltered environment. The terrarium may include a removable lid which has an internal upper surface that is shaped to direct condensate forming on the upper surface of the lid to a particular area of the plant. The terrarium may include a base and lid having overlapping portions wherein the overlapping portions include edge deviations or apertures defining open spaces that may be brought into co-alignment to provide for no, partial or full aeration.

BACKGROUND OF THE INVENTION

Terrariums of various types have been used since the 1800's and can generally be classified as open type (typically used for dry plants) and closed type (typically used for tropical plants). A terrarium is a container made of glass or other transparent material that takes in sunlight and carbon dioxide, and through photosynthesis produces food for the enclosed plant which then gives off oxygen and transpires water that condenses and runs down the sides of the container to water the plant. Closed type terrariums are usually sealed and require little to no watering because condensate forms to allow the terrarium to effectively "self-water". However, these terrariums do need to be opened at regular intervals (typically once a week) to remove excess moisture from the air and walls of the container. Open type terrariums are not sealed and require more watering because the moisture escapes.

There are known problems associated with closed-type terrariums. For example, the shape and configuration of some known terrarium enclosures do not lend themselves to providing the necessary level of humidity and shelter. Moss does not assimilate water through its roots, instead it uptakes water through its foliage, hence when owners forget to open the lid at regular intervals, excess moisture can accumulate and effectively over-water the plant. This can lead to the growth of mould which can damage plants and discolour the inside of the terrarium. Another problem arises when certain areas of the plant do not receive sufficient condensate, which can lead to flourishing areas around the sides where condensate runs down the walls, for example, but a central area which is wilted and dying through lack of water.

It is therefore an object of the present invention to overcome at least some of the aforementioned problems or to provide the public with a useful alternative.

Throughout this specification, reference to a "plant" is not intended to be limited to any one plant variety. For example, a plant as referenced herein may include mosses, orchids, ferns and/or air plants. In addition, whilst not specifically described, the terrarium could include a soil mix to ensure good growing conditions for the plant.

SUMMARY OF THE INVENTION

In one aspect, the present invention provides a terrarium including:

a base having a bottom portion for supporting, or facilitating the support of, a plant, and an upright wall portion having an upper edge;

a removable lid including a top portion, and an upright wall portion having a lower edge; and wherein the upper edge of the base upright wall portion and the lower edge of the lid upright wall portion are configured for removable engagement, the dimensions of the wall portions being such that when the upper and lower edges are engaged, the base and lid create at least a partial enclosure around the plant.

In an embodiment, the top portion of the lid includes an internal surface having at least one downwardly extending projection for directing condensate forming on the top portion internal surface to a particular area of the plant disposed beneath the downwardly extending projection.

In an embodiment, the at least one downwardly extending projection has a substantially inverted cone shape which terminates at a point below the top surface for directing droplets of condensate to the particular area.

In an embodiment, the downwardly extending projection is formed centrally in the internal surface of the top portion of the lid to direct condensate to a central area of the base.

In an embodiment, the terrarium is substantially cylindrical in shape and the upright wall portion of each of the base and removable lid includes a circular cross section of comparable diameter.

In an embodiment, the upper edge of the base upright wall portion includes an inner vertically extending lip and an outer horizontally extending support surface, the lip extending higher than the support surface, wherein the lower edge of the lid upright wall portion is dimensioned to rest upon the support surface whilst overlapping with the vertically extending lip.

In an embodiment, each of the lip associated with the upper edge of the base upright wall portion and the lower edge of the lid upright wall portion includes one or more edge deviations or apertures defining open spaces which may be brought into co-alignment by rotation of the removable lid relative to the base.

In an embodiment, when the one or more edge deviations or apertures are not co-aligned, the terrarium is in a substantially sealed condition.

In an embodiment, when the one or more edge deviations or apertures are partially co-aligned, the terrarium is in a partially aerated condition.

In an embodiment, when the one or more edge deviations or apertures are fully co-aligned, the terrarium is in a fully aerated condition.

In an embodiment, the plant is a layer of moss and the terrarium further includes a removable insert supported above said base bottom portion, said insert including a circular, domed surface for supporting said layer of moss.

In an embodiment, the insert further includes a convex-shaped moat extending around the perimeter of the circular, domed surface, said moat configured to hold excess moisture directed into the moat including from the upright wall portions and from the domed surface.

In an embodiment, the base is not transparent and the domed surface of the insert rises to a height which substantially corresponds with a height of the base upright wall portion.

In an embodiment, at least the removable lid is made of transparent material such that the plant is viewable even when the plant is enclosed by the removable lid.

In another aspect, the present invention provides a terrarium including:

a base having a bottom portion for supporting or facilitating the support of a plant, said base further including a base upright wall portion having an upper edge;

a removable lid including a top portion and a lid upright wall portion having a lower edge;

wherein the upper edge of the base upright wall portion and the lower edge of the lid upright wall portion are configured for removable engagement, the dimensions of the wall portions being such that when the upper and lower edges are engaged, the base and lid create at least a partial enclosure around the plant or moss; and wherein the top portion of the lid includes an internal surface having at least one downwardly extending projection for directing condensate forming on the internal surface to a particular area of the plant supported by the base.

In another aspect, the present invention provides a terrarium including:

a base having a bottom portion for supporting or facilitating the support of a plant, said base further including a base upright wall portion having an upper edge;

a removable lid including a top portion and a lid upright wall portion having a lower edge;

wherein the upper edge of the base upright wall portion and the lower edge of the lid upright wall portion are configured for removable engagement, the dimensions of the wall portions being such that when the upper and lower edges are engaged, the base and lid create at least a partial enclosure around the plant or moss;

wherein the upper edge of the base upright wall portion includes an inner vertically extending lip and an outer horizontally extending support surface, the lip extending higher than the support surface, wherein the lower edge of the lid upright wall portion is dimensioned to rest upon the support surface whilst overlapping with the vertically extending lip; and wherein each of the lip associated with the upper edge of the base upright wall portion and the lower edge of the lid upright wall portion includes one or more edge deviations or apertures which may be brought into co-alignment by rotation of the removable lid relative to the base.

In another aspect, the present invention provides a terrarium including:

a base having a bottom portion for supporting or facilitating the support of a plant, said base further including a base upright wall portion having an upper edge;

a removable lid including a top portion and a lid upright wall portion having a lower edge;

wherein the upper edge of the base upright wall portion and the lower edge of the lid upright wall portion are configured for removable engagement, the dimensions of the wall portions being such that when the upper and lower edges are engaged, the base and lid create at least a partial enclosure around the plant or moss;

wherein the top portion of the lid includes an internal surface having at least one downwardly extending projection for directing condensate forming on the internal surface to a particular area of the plant supported by the base;

wherein the upper edge of the base upright wall portion includes an inner vertically extending lip and an outer horizontally extending support surface, the lip extending higher than the support surface, wherein the lower edge of the lid upright wall portion is dimensioned to rest upon the support surface whilst overlapping with the vertically extending lip; and wherein each of the lip associated with the upper edge of the base upright wall portion and the lower edge of the lid upright wall portion includes one or more edge deviations or apertures which may be brought into co-alignment by rotation of the removable lid relative to the base.

BRIEF DESCRIPTION OF THE DRAWINGS

Features of the present disclosure are illustrated by way of example and not limited in the following figure(s), in which like numerals indicate like elements, in which.

DETAILED DESCRIPTION OF THE EMBODIMENT(S) OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1:
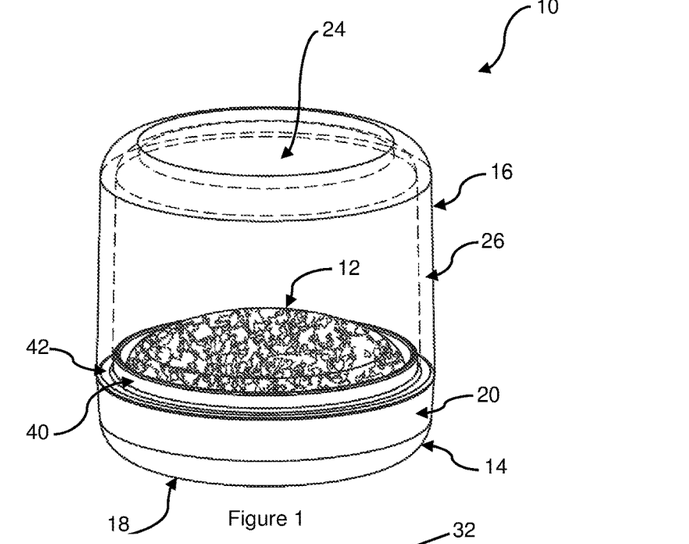
FIG. 1 shows a perspective view (including some internal components) of a terrarium including a base and removable lid in accordance with an embodiment.

Disclosed herein are examples of a terrarium 10 of the closed-type adapted to hold and to provide a humid and sheltered environment for a plant 12, typically tropical plants such as moss. A terrarium 10, according to an example of the present disclosure, is shown in FIG. 1 including at least a base 14 and a removable lid 16. The base 14 may include a bottom portion 18 for supporting, or facilitating the support of, the plant 12, and an upright wall portion 20 having an upper edge 22. The removable lid 16 may include a top portion 24, and an upright wall portion 26 having a lower edge 28. The upper edge 22 of the base upright wall portion 20 and the lower edge 28 of the lid upright wall portion 26 are configured for removable engagement, whereby the dimensions of the wall portions 20 and 26 may be such that when the upper 22 and lower 28 edges are engaged, the base 14 and lid 16 create at least a partial enclosure around the plant 12.

As mentioned above, the base bottom portion 18 may directly support, or may indirectly facilitate the support of, a plant 12. An example of indirect support is also shown in FIG. 1 in the form of a removable insert 30 configured to sit above the base bottom portion 18. In an embodiment, the plant may be a layer of moss and the insert may include a circular, domed surface 32 for supporting the layer of moss 12.

Figure 5:
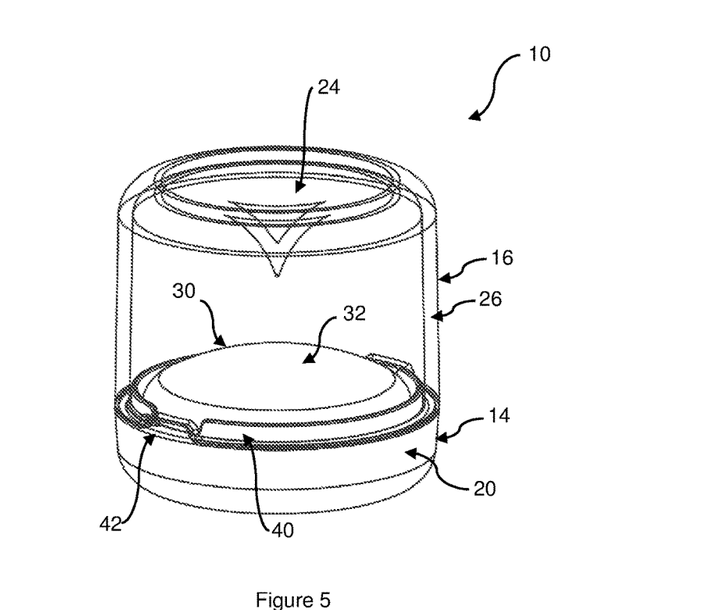
FIG. 5 shows a perspective view (including some internal components) of a terrarium according to an embodiment including a lid having a downwardly extending projection for directing condensate to a particular area of a plant supported by the base.
Figure 6:
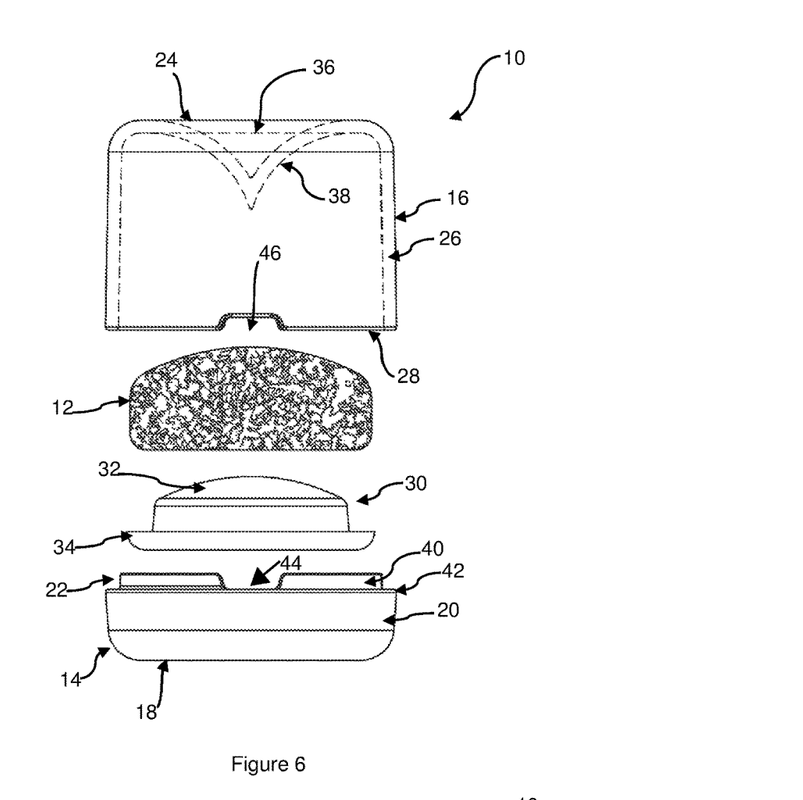
FIG. 6 shows an exploded, side view of the terrarium of FIG. 5 enclosing moss.
Figure 7:
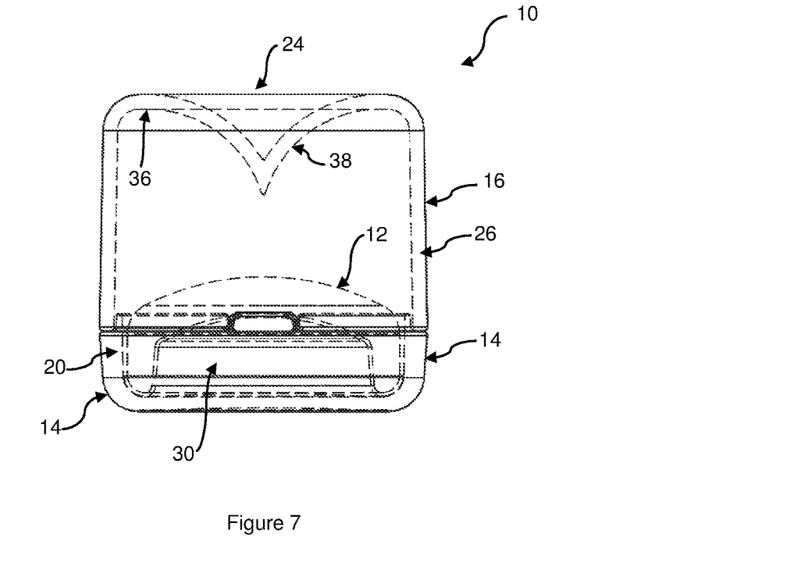
FIG. 7 shows a side view (including some internal components) of the terrarium of FIG. 6.
Figure 8:
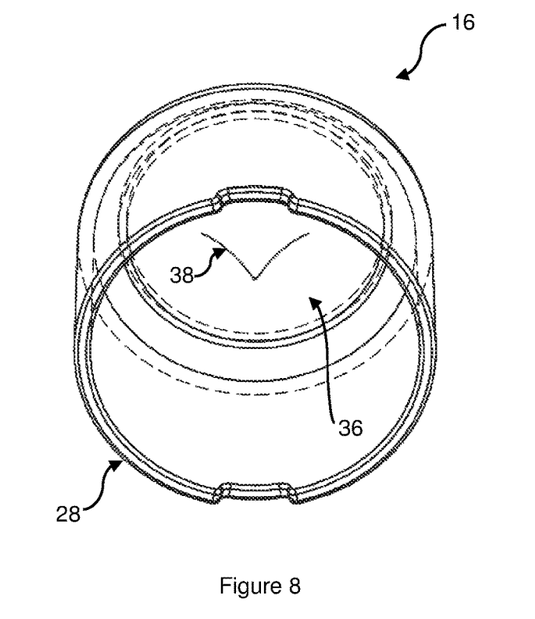
FIG. 8 shows an underside perspective view of the removable lid of the terrarium shown in FIGS. 5 to 7.

The insert 30 may further include a convex-shaped moat 34 extending around the rim of the circular, domed surface 32, the moat configured to hold excess moisture directed into the moat 34 including from the upright wall portions 26 of the lid 16 and from the domed surface 32 itself. An example of such a moat 34 is perhaps most clearly shown in FIGS. 3 and 5. The skilled addressee would appreciate that in using the insert 30, moss may be trimmed to the size of the domed surface 32 and draped over as shown in FIG. 1. The raised domed shape is mainly for aesthetic purposes to ensure the moss presents well above the base, which may not necessarily be transparent, and in this regard the reader will note that the domed surface 32 rises to approximately the same height as the upper edge 22 of the base 14. The insert 30 also allows for removal of the plant 12 with minimal disturbance when cleaning the base 14 and/or changing water.

Figure 2:
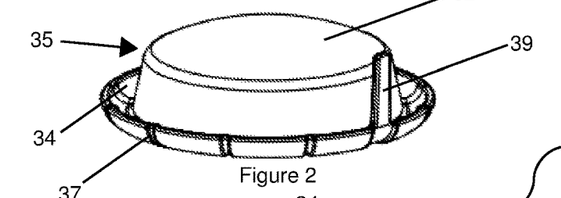
FIG. 2 shows a perspective view of a removable plant supporting insert according to a further embodiment.

It is to be understood that other plant supporting inserts could be used. FIG. 2 shows another example of a removeable insert 35 having a domed surface and moat (and therefore using same references numerals 32 and 34 respectively), but further including grooves 37 that better enable the transfer of water from under the insert. The grooves enable the space under the insert to be utilised as a water reservoir which provides a source of water to the system. This is useful in conditions where the terrarium is at least partially aerated (as described later in this specification) as losses can occur. Accordingly, the insert 35 may extend the time before maintenance (cleaning, etc) needs to take place again. More specifically, the grooves 37 enable the water under the insert to evaporate, condense and drop onto the plant. The insert 35 may also include a tab 39 extending upwardly from the moat 34 that makes it easier to remove the insert without disturbing the plant 12. The insert 35/moss can then be removed to facilitate cleaning and changing of water.

According to an embodiment, at least the removable lid 16 is made of transparent material such that the plant 12 is viewable through the lid 16 even when the plant 12 is enclosed by the removable lid 16. As shown in the drawings, the terrarium may be substantially cylindrical in shape and the upright wall portion 20 and 26 of each of the base 14 and removeable lid 16 respectively includes a circular cross section of comparable outer diameter.

Figure 3:
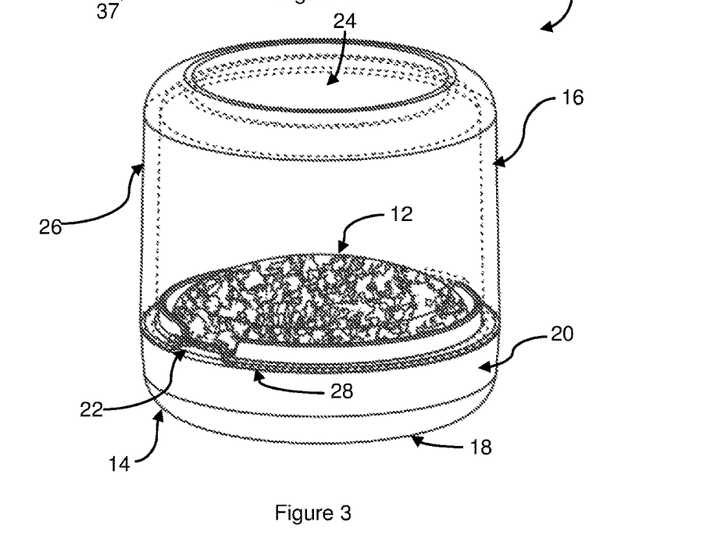
FIG. 3 shows a perspective view (including some internal components) of a terrarium enclosing moss according to an embodiment and including a base and removable lid having overlapping portions including edge deviations which may be brought into co-alignment to provide for no, partial or full aeration.
Figure 4:
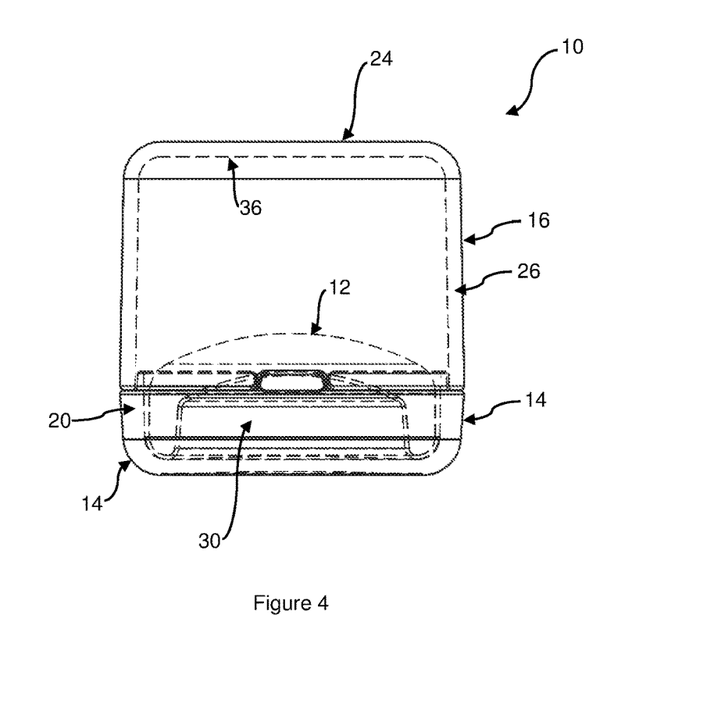
FIG. 4 shows a side view (including some internal components) of the terrarium of FIG. 3.

The terrarium 10 may include a means of aerating the plant formed between the base 14 and replaceable lid 16 which enables the level of aeration to be controlled by rotation of the lid 16 for example. An example of a terrarium including such an aeration means is shown in FIGS. 3 and 4, and this means of aeration is described in more detail below with reference to FIGS. 10a-10c and 11a-11c. The skilled addressee would appreciate that enabling a user to control the level of aeration eliminates or at least minimizes the need for a user to regularly monitor whether excess moisture exists inside the enclosure and opening the lid at regular intervals. In addition, the terrarium 10 may be placed at different areas around a home or office, for example, wherein some areas may receive more sunlight or more humidity than others, and the level of aeration can be adjusted by the user accordingly. Similarly, the aeration can be controlled according to the environment, allowing for changes in the seasons and different climates.

The terrarium 10 may further include a means of directing condensate to a specific area of the base and therefore the plant supported above the base. For example, where the plant 12 is a moss draped over an insert 30/35, as earlier described, there may be benefit in ensuring that condensate falls centrally on the moss (in addition to condensate running down the side walls of the lid onto the plant). For example, the top portion 24 of the removable lid 16 may include an internal surface 36 having at least one downwardly extending projection 38 for directing condensate 39 forming on the top portion internal surface 36 to a particular area of the plant 12 disposed beneath the downwardly extending projection 38. The skilled addressee would understand that the downwardly extending projection effectively acts as a rain simulator and a natural water cycle.

Figure 9:
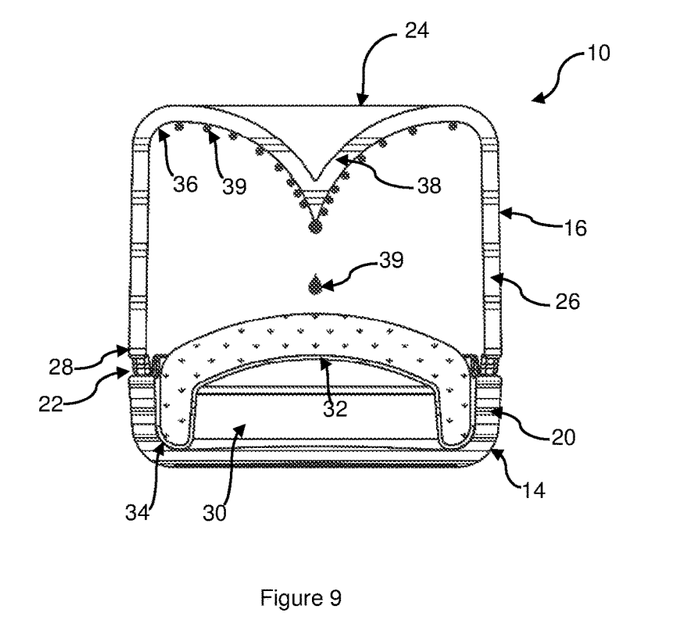
FIG. 9 shows a cross sectional view through the terrarium shown in FIGS. 5 to 7 enclosing moss and wherein condensate forming on the inner surface of the lid is directed to a centre of the moss via the downwardly extending projection.
Figure 10A:
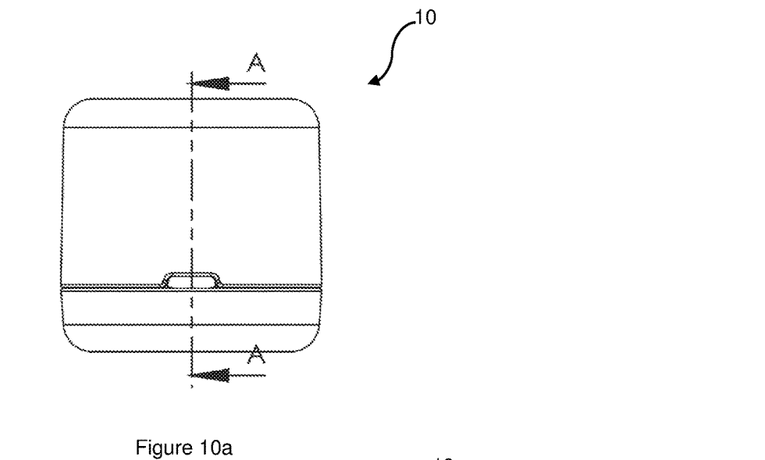
FIG. 10a shows the terrarium side view of FIG. 7 (without internal components shown) and identifying cross-section line A-A.
Figure 10B:
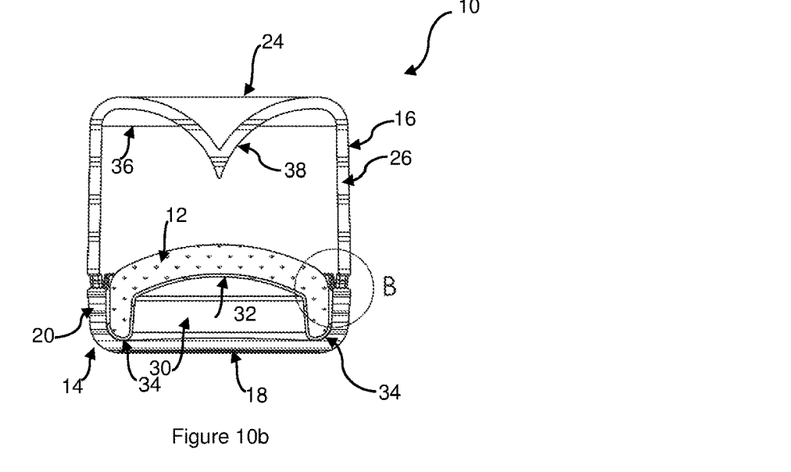
FIG. 10b shows a cross-sectional view of the terrarium of FIG. 10a through cross-section line A-A, and identifying area B.
Figure 10C:
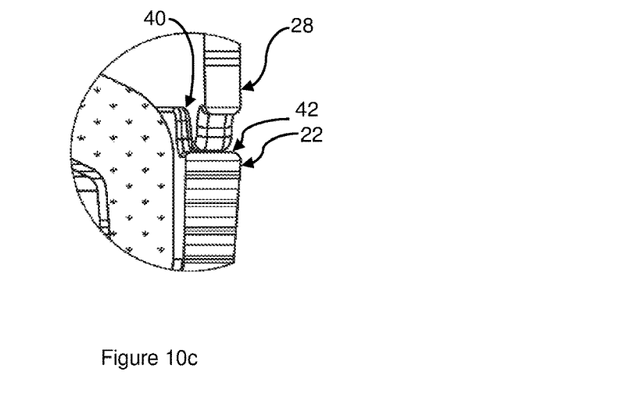
FIG. 10c shows an enlarged view of area B identified in FIG. 10b.
Figure 11A:
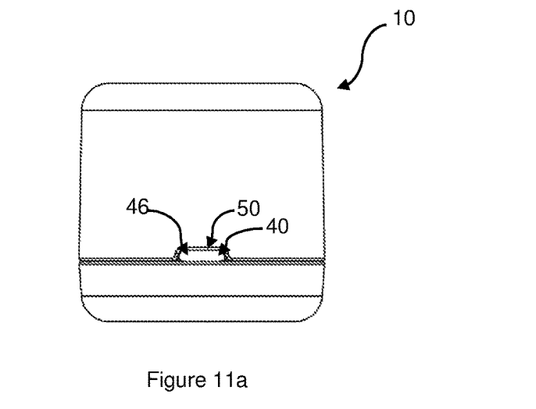
FIG. 11a shows the terrarium side view of FIG. 7 (without internal components shown) in a fully aerated configuration.
Figure 11B:
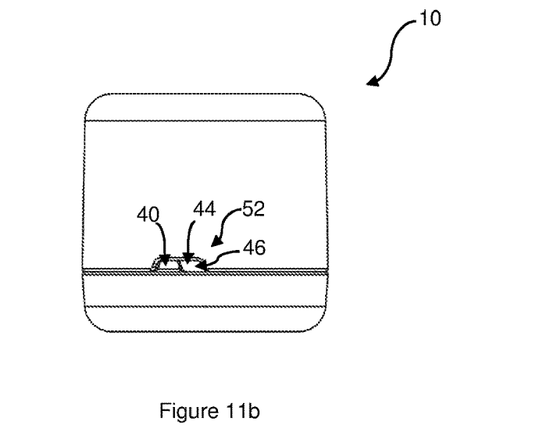
FIG. 11b shows the terrarium side view of FIG. 7 (without internal components shown) in a partially aerated configuration.
Figure 11C:
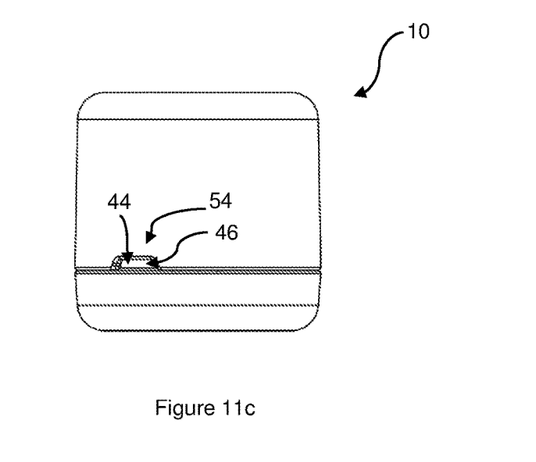
FIG. 11c shows the terrarium side view of FIG. 7 (without internal components shown) in a substantially sealed configuration.

In the lid 16 shown in FIGS. 5 to 8, the at least one downwardly extending projection 38 is a substantially inverted cone shape formed centrally in the internal surface 36 of the top portion 24 of the lid 16, the cone shape terminating at a point below the internal surface 36 for directing droplets 39 of condensate to a central area of moss disposed beneath. In ensuring that condensate reaches the centre of the plant as well as the edges (through runoff of condensate from the side walls), the plant is less prone to wilting and dying through lack of water. FIG. 9 shows a cross-sectional view of an example terrarium including the downwardly extending projection 38 and the movement of condensate droplets 39 from the top surface 36 down the projection 38 and onto a central portion of moss disposed beneath.

It is to be understood that other projection shapes may be possible, and that the present invention is not intended to be limited to any one shape, number, or position of such projection(s).

As discussed earlier, the terrarium 10 may include a means of controlling the amount of air that enters the enclosure. In an embodiment, and as shown in the example terrarium 10 shown in FIGS. 10a to 10c and 11a to 11c, the upper edge 22 of the base upright wall portion 20 may include an inner vertically extending lip 40 and an outer horizontally extending support surface 42, the lip 40 extending higher than the support surface 42, wherein the lower edge 28 of the lid upright wall portion 26 is dimensioned to rest upon the support surface 42 whilst substantially overlapping with the vertically extending lip 40. Each of the lip 40 associated with the upper edge 22 of the base upright wall portion 20 and the lower edge 28 of the lid upright wall portion 26 may include one or more edge deviations 44 and 46 respectively which may be brought into co-alignment by rotation of the removable lid relative to the base.

In a further example terrarium (not shown), the edge deviations may be replaced by or additionally include apertures spaced from each of the edges 22 and 28 which are similarly able to be brought into co-alignment.

The skilled addressee would appreciate that when the lid 16 is rotated to a certain location relative to the base 12 such that the one or more edge deviations 44 and 46 are not co-aligned, the terrarium 10 is in a substantially sealed condition 50. In other words, air is substantially prevented from passing into the enclosure via the edge deviations 44 and 46. This sealed condition 50 is shown specifically in FIG. 11a. When the lid 16 is rotated relative to the base 14 such that the one or more edge deviations 44 and 46 become partially co-aligned, the terrarium 10 is in a partially aerated condition 52 wherein air is able to enter the enclosure through the co-aligned portions of the spaces created by these deviations. This sealed condition 52 is shown specifically in FIG. 11b. When the one or more edge deviations 44 are fully co-aligned wherein air is able to enter the enclosure through the entire space provided by the co-aligned edge deviations, the terrarium is in a fully aerated condition 54. This fully aerated condition 54 is shown specifically in FIG. 11c.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

Throughout this specification and claims which follow, unless the context requires otherwise, the word "comprise", and variations such as "comprises" and "comprising", will be understood to imply the inclusion of a stated integer or step, or group of integers or steps, but not the exclusion of any other integer or step, or group of integers or steps.

The reference to any prior art in this specification is not, and should not be taken as, an acknowledgement or any suggestion that the prior art forms part of the common general knowledge.

The claims defining the invention are as follows:

1. A terrarium including:
    a base having a bottom portion for supporting, or facilitating the support of, a plant, and an upright wall portion having an upper edge;
    a removable lid including a top portion, and an upright wall portion having a lower edge;
    wherein the upper edge of the base upright wall portion and the lower edge of the lid upright wall portion are configured for removable engagement, the dimensions of the wall portions being such that when the upper and lower edges are engaged, the base and lid create at least a partial enclosure around the plant; and
    wherein the top portion of the lid includes at least one downwardly extending projection where one or more walls of the projection taper inwardly and terminate at a point below the top surface for directing condensate forming on the top portion internal surface to a particular area of the plant disposed beneath the downwardly extending projection.

2. A terrarium according to claim 1 wherein the downwardly extending projection is an inverted cone shape with a straight or curved wall.

3. A terrarium according to claim 1, wherein the downwardly extending projection is an inverted frusto-conical shape with a straight or curved wall.

4. A terrarium according to claim 1, wherein the downwardly extending projection is formed centrally in the internal surface of the top portion of the lid to direct condensate to a central area of the base.

5. A terrarium according to claim 1, wherein the terrarium is substantially cylindrical in shape and the upright wall portion of each of the base and removable lid includes a circular cross section of comparable diameter.

6. A terrarium according to claim 5, wherein the upper edge of the base upright wall portion includes an inner vertically extending lip and an outer horizontally extending support surface, the lip extending higher than the support surface, wherein the lower edge of the lid upright wall portion is dimensioned to rest upon the support surface whilst overlapping with the vertically extending lip.

7. A terrarium according to claim 6, wherein each of the lip associated with the upper edge of the base upright wall portion and the lower edge of the lid upright wall portion includes one or more edge openings which may be brought into horizontal co-alignment by rotation of the removable lid about a vertical axis relative to the base.

8. A terrarium according to claim 7, wherein when the one or more edge openings are not horizontally co-aligned, the terrarium is in a substantially sealed condition.

9. A terrarium according to claim 7, wherein when the one or more edge openings are partially horizontally co-aligned, the terrarium is in a partially aerated condition.

10. A terrarium according to claim 7, wherein when the one or more edge openings are fully horizontally co-aligned, the terrarium is in a fully aerated condition.

11. A terrarium according to claim 1, wherein the plant is a layer of moss and the terrarium further includes a removable insert supported above said base bottom portion, said insert including a circular, domed surface for supporting said layer of moss.

12. A terrarium according claim 11 wherein the insert further includes a convex-shaped moat extending around the perimeter of the circular, domed surface, said moat configured to hold excess moisture directed into the moat including from the upright wall portions and from the domed surface.

13. A terrarium according to claim 11, wherein the base is not transparent and the domed surface of the insert rises to a height which substantially corresponds with a height of the base upright wall portion.

14. A terrarium according to claim 1, wherein at least the removable lid is made of transparent material such that the plant is viewable even when the plant is enclosed by the removable lid.

15. A terrarium including:
    a base having a bottom portion for supporting, or facilitating the support of, a plant, and an upright wall portion having an upper edge; and
    a removable lid including a top portion, and an upright wall portion having a lower edge;
    wherein the upper edge of the base upright wall portion and the lower edge of the lid upright wall portion are configured for removable engagement, the dimensions of the wall portions being such that when the upper and lower edges are engaged, the base and lid create at least a partial enclosure around the plant;

wherein the terrarium is substantially cylindrical in shape and the upright wall portion of each of the base and removable lid includes a circular cross section of comparable diameter;

wherein the upper edge of the base upright wall portion includes an inner vertically extending lip and an outer horizontally extending support surface, the lip extending higher than the support surface, wherein the lower edge of the lid upright wall portion is dimensioned to rest upon the support surface whilst overlapping with the vertically extending lip; and wherein each of the lip associated with the upper edge of the base upright wall portion and the lower edge of the lid upright wall portion includes one or more edge openings which may be brought into horizontal co-alignment by rotation of the removable lid about a vertical axis relative to the base, including:

partial co-alignment which causes the terrarium to be in a partially aerated condition, or full co-alignment which causes the terrarium to be in a fully aerated condition.

16. A terrarium according to claim 15, wherein the top portion of the lid includes an internal surface having at least one downwardly extending projection for directing condensate forming on the internal surface to a particular area of the plant supported by the base.

17. A terrarium including:

a base having a bottom portion for supporting, or facilitating the support of, a plant, and an upright wall portion having an upper edge; and a removable lid including a top portion, and an upright wall portion having a lower edge;

wherein the upper edge of the base upright wall portion and the lower edge of the lid upright wall portion are configured for removable engagement, the dimensions of the wall portions being such that when the upper and lower edges are engaged, the base and lid create at least a partial enclosure around the plant;

wherein the plant is a layer of moss and the terrarium further includes a removable insert supported above said base bottom portion, said insert including a circular, domed surface for supporting said layer of moss; and wherein the insert further includes a convex-shaped moat extending around the perimeter of the circular, domed surface, said moat configured to hold excess moisture directed into the moat including from the upright wall portions and from the domed surface.

18. A terrarium according to claim 17, wherein the top portion of the lid includes an internal surface having at least one downwardly extending projection for directing condensate forming on the internal surface to a particular area of the plant supported by the base.

19. A terrarium including:

a base having a bottom portion for supporting, or facilitating the support of, a plant, and an upright wall portion having an upper edge; and a removable lid including a top portion, and an upright wall portion having a lower edge;

wherein the upper edge of the base upright wall portion and the lower edge of the lid upright wall portion are configured for removable engagement, the dimensions of the wall portions being such that when the upper and lower edges are engaged, the base and lid create at least a partial enclosure around the plant;

wherein the plant is a layer of moss and the terrarium further includes a removable insert supported above said base bottom portion, said insert including a circular, domed surface for supporting said layer of moss; and wherein the base is not transparent and the domed surface of the insert rises to a height which substantially corresponds with a height of the base upright wall portion.

20. A terrarium according to claim 19, wherein the top portion of the lid includes an internal surface having at least one downwardly extending projection for directing condensate forming on the internal surface to a particular area of the plant supported by the base.

* * * * *

UNITED STATES PATENT AND TRADEMARK OFFICE
CERTIFICATE OF CORRECTION

PATENT NO. : 10,292,339 B2
APPLICATION NO. : 15/294597
DATED : May 21, 2019
INVENTOR(S) : Simon Ross Zappia et al.

Page 1 of 1

It is certified that error appears in the above-identified patent and that said Letters Patent is hereby corrected as shown below:

On the Title Page

Column 1, after Item (65), Mar. 23, 2017, insert:
-- (30) Foreign Application Priority Data
Sept. 8, 2015 (AU)...................................2015224399 --

Signed and Sealed this
Fourteenth Day of April, 2020

Andrei Iancu
*Director of the United States Patent and Trademark Office*